United States Patent
Sarikaya et al.

(10) Patent No.: US 9,875,237 B2
(45) Date of Patent: Jan. 23, 2018

(54) USING HUMAN PERCEPTION IN BUILDING LANGUAGE UNDERSTANDING MODELS

(71) Applicant: Microsoft Technology Licensing, LLC, Redmond, WA (US)

(72) Inventors: Ruhi Sarikaya, Redmond, WA (US); Anoop Deoras, San Jose, CA (US); Fethiye Asli Celikyilmaz, Mountain View, CA (US); Zhaleh Feizollahi, Bellevue, WA (US)

(73) Assignee: MICROSFOT TECHNOLOGY LICENSING, LLC, Redmond, WA (US)

(*) Notice: Subject to any disclaimer, the term of this patent is extended or adjusted under 35 U.S.C. 154(b) by 287 days.

(21) Appl. No.: 13/826,173

(22) Filed: Mar. 14, 2013

(65) Prior Publication Data

US 2014/0278355 A1    Sep. 18, 2014

(51) Int. Cl.
| | | |
|---|---|---|
| G06F 17/28 | (2006.01) | |
| G06E 1/00 | (2006.01) | |
| G06E 3/00 | (2006.01) | |
| G06F 17/00 | (2006.01) | |
| G06F 17/30 | (2006.01) | |
| G06F 17/27 | (2006.01) | |

(52) U.S. Cl.
CPC .......... *G06F 17/28* (2013.01); *G06F 17/2785* (2013.01)

(58) Field of Classification Search
CPC ......... G06F 17/30864; G06F 17/30705; G06F 17/2715; G06F 17/30268; G06F 17/30011; G06F 17/30265; G06F 17/30654; G06F 17/2881; G06F 17/30401; G06F 17/30648; G10L 15/063; G10L 2015/0635; H04L 67/306
USPC .................................. 706/16; 707/722, 723
See application file for complete search history.

(56) References Cited

U.S. PATENT DOCUMENTS

| | | | |
|---|---|---|---|
| 7,424,675 B2* | 9/2008 | Lee ..................... | G06F 17/2223 704/1 |
| 7,664,747 B2* | 2/2010 | Petras et al. .................. | 707/805 |
| 8,005,774 B2 | 8/2011 | Chapelle | |

(Continued)

OTHER PUBLICATIONS

Christensen, et al., "On Perceptual Distortion Minimization and Nonlinear Least-Squares Frequency Estimation", In IEEE Transactions on Audio, Speech, and Language Processing, Jan. 2006, 11 pages.

(Continued)

*Primary Examiner* — Michael Ortiz Sanchez (57) ABSTRACT

An understanding model is trained to account for human perception of the perceived relative importance of different tagged items (e.g. slot/intent/domain). Instead of treating each tagged item as equally important, human perception is used to adjust the training of the understanding model by associating a perceived weight with each of the different predicted items. The relative perceptual importance of the different items may be modeled using different methods (e.g. as a simple weight vector, a model trained using features (lexical, knowledge, slot type, . . . ), and the like). The perceptual weight vector and/or or model are incorporated into the understanding model training process where items that are perceptually more important are weighted more heavily as compared to the items that are determined by human perception as less important.

19 Claims, 8 Drawing Sheets

(56) References Cited

U.S. PATENT DOCUMENTS

| | | | |
|---|---|---|---|
| 8,051,072 B2 | 11/2011 | Zheng et al. | |
| 8,086,549 B2 | 12/2011 | Qi et al. | |
| 8,131,743 B1* | 3/2012 | Joyce | G06F 17/30436 707/759 |
| 8,185,523 B2* | 5/2012 | Lu et al. | 707/723 |
| 8,200,663 B2* | 6/2012 | Jones et al. | 707/723 |
| 8,219,511 B2* | 7/2012 | Yang | G06N 99/005 706/20 |
| 8,250,015 B2* | 8/2012 | Li et al. | 706/45 |
| 8,370,372 B2* | 2/2013 | Jones | G06F 17/30864 707/706 |
| 8,832,091 B1* | 9/2014 | Bhagat et al. | 707/723 |
| 8,949,264 B2* | 2/2015 | Cohen | G06F 17/30401 707/760 |
| 2004/0236575 A1* | 11/2004 | Goronzy | G10L 15/08 704/231 |
| 2005/0154580 A1* | 7/2005 | Horowitz et al. | 704/9 |
| 2007/0106659 A1* | 5/2007 | Lu et al. | 707/5 |
| 2007/0106685 A1* | 5/2007 | Houh et al. | 707/102 |
| 2008/0201370 A1* | 8/2008 | Kemp | G06F 17/30017 |
| 2009/0070103 A1* | 3/2009 | Beggelman et al. | 704/9 |
| 2009/0125461 A1* | 5/2009 | Qi et al. | 706/12 |
| 2009/0138463 A1* | 5/2009 | Chapelle | 707/5 |
| 2010/0011025 A1* | 1/2010 | Zheng | G06F 17/30675 707/E17.005 |
| 2010/0185623 A1 | 7/2010 | Lu et al. | |
| 2010/0217732 A1* | 8/2010 | Yang | G06N 99/005 706/21 |
| 2010/0235164 A1* | 9/2010 | Todhunter et al. | 704/9 |
| 2012/0022866 A1* | 1/2012 | Ballinger et al. | 704/235 |
| 2012/0078825 A1 | 3/2012 | Kulkarni et al. | |
| 2012/0290293 A1* | 11/2012 | Hakkani-Tur et al. | 704/9 |
| 2012/0310926 A1* | 12/2012 | Gannu et al. | 707/723 |
| 2014/0223296 A1* | 8/2014 | Solmer | G06F 17/30696 715/273 |
| 2014/0279730 A1* | 9/2014 | Gamon | G06F 17/30864 706/12 |
| 2014/0309993 A1* | 10/2014 | Goussard | 704/231 |
| 2015/0113013 A1* | 4/2015 | Rys | G06F 17/30386 707/758 |
| 2015/0347519 A1* | 12/2015 | Hornkvist | G06F 17/30522 707/722 |

OTHER PUBLICATIONS

Le, et al., "Ensuring Quality in Crowdsourced Search Relevance Evaluation: The Effects of Training Question Distribution", In Proceedings of the SIGIR Workshop on Crowdsourcing for Search Evaluation, Jul. 23, 2010, 4 pages.

Lazzaro, et al., "JPEG Quality Transcoding using Neural Networks Trained with a Perceptual Error Measure", In Journal of Neural Computation, vol. 11, Issue 1, Jan. 1999, 24 pages.

* cited by examiner

USING HUMAN PERCEPTION IN BUILDING LANGUAGE UNDERSTANDING MODELS

BACKGROUND

Initially, language understanding systems were built for single modal applications (e.g. voice over the phone contact centers). Recently, language understanding systems are built for multimodal applications (e.g. entertainment content search), where the system can respond to the user in different modalities (e.g. voice-out/text-out/UI, and the like). Language understanding systems may use a set of models which are trained using various machine learning techniques. The typical model set contains domain, intent and slot models. These models may be trained using such techniques as Support Vector Machine (SVM), Boosting, Maximum Entropy Models, Conditional Random Fields (CRMs), Neural Networks, Deep Belief Networks, and the like. These techniques use labeled data to learn the discrimination between various intents for the intent prediction (and various domains for the domain prediction/various slots for the slot tagging). The parameters of these models are learned by minimizing the error for various objective functions. These objective functions tend to be functions of the errors (i.e. the difference between predicted and true label). These models are trained both to predict the reference labels and also to discriminate between these labels.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An understanding model is trained to account for human perception of the relative importance of different tagged items (e.g. slot/intent/domain). Instead of treating each tagged item as equally important in the model, human perception is used to adjust the training of the language understanding model by associating a perceived weight with each of the predicted items. For example, given an utterance, a system understanding (e.g. tagged items) and different results obtained from a knowledge source by introducing error into a query (e.g. removing/changing one or more tagged items), a human perception rating for each of the tagged items is received. The human perception rating may be a complex rating system and/or a simple rating system. The human perception ratings may come from one or more judges and/or a model created using human perception and may be aggregated to obtain an overall perception regarding the differences in item importance. The relative perceptual importance of the different items may be modeled using different methods (e.g. as a simple weight vector, a model trained using features (lexical, knowledge, slot type, . . . ), and the like). The perceptual weight vector and/or or model are incorporated into the understanding model training process where items that are perceptually more important are weighted more heavily as compared to the items that are determined by human perception as less important.

DETAILED DESCRIPTION

Referring now to the drawings, in which like numerals represent like elements, various embodiment will be described.

Figure 1:
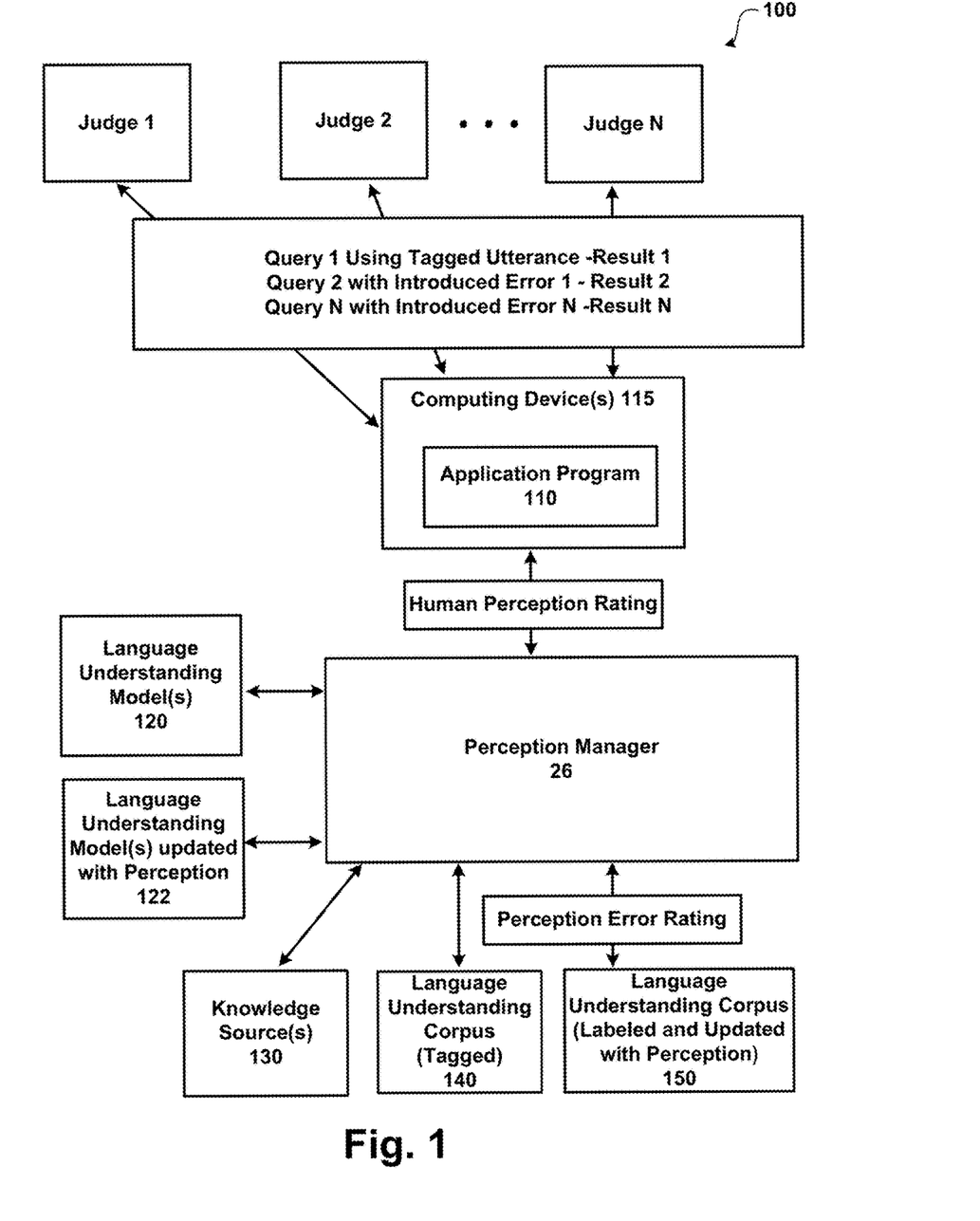
FIG. 1 shows a system using human perception in building understanding models.

FIG. 1 shows a system using human perception in building understanding models. As illustrated, system 100 includes computing device(s) 115, perception manager 26, judges 1-N, knowledge source(s) 130, language understanding corpus 140, and language understanding corpus with perception 150. One or more computing devices 115 may be used to receive input (e.g. human perception) from one or more judges.

Generally, Natural Language Understanding (NLU) in goal-oriented dialog systems is directed at identifying the domain(s) and intent(s) of the user, as expressed in natural language (NL), and to extract associated arguments or slots. For example, in an airline domain, users often request flight information (e.g. "I want to fly to Boston from New York next week"). Different classification methods may be used for filling frame slots from the application domain using a given training data set and performed comparative experiments. These methods generally use generative models such as hidden Markov models, discriminative classification methods and probabilistic context free grammars. Some NLU models are trained using supervised machine learning methods. These models use a large number of in-domain sentences which are semantically annotated by humans. Additionally, NLU models may use in-domain gazetteers (such as city, movie, actor, or restaurant names) for better generalization.

Traditional training of NLU systems uses queries that are manually labeled (domain, intent, and slots) and equally weighted. In other words, each of the different slots/domains/intents are assigned a same weight. The traditional methods using labeled data learn the discrimination between various intents for the intent prediction (and various domains for the domain prediction/various slots for the slot tagging). The parameters of these understanding models are typically learned by minimizing various objective functions. The objective functions tend to be functions of the errors (i.e. the difference between predicted and true label). These models are trained both to predict the reference labels and also to discriminate between these labels.

The objective functions used in these machine learning techniques to train the language understanding models in traditional system do not distinguish between different errors the models are making Instead, the errors are treated equally when computing the objective function and estimating the model parameters. For example, in the movie domain (where users search for movies using natural language and play them with natural language commands) there are many different slot types (e.g. movie star, movie release date, movie rating, and the like). Treating these slots equally in training the models (as traditional models) may not correlate with a human perception of the errors. The perceptual impact of the errors for different slot types may be substantially different. The perceptual importance of the "MovieStar" tag may be much greater than the perceptual importance of the "ReleaseDate" tag. For example, a user of the dialog system may be more forgiving if the system displays "four star Brad Pitt movies" as compare to displaying "recent four star movies".

Perception manager 26 is used to train an understanding model to account for human perception using the perceived relative importance of different tagged items (e.g. slot/intent/domain). Instead of treating each tagged item as equally important when training an understanding model as traditional training systems, human perception is used to adjust the understanding model by associating a perceived weight with each of the different items. For example, judges 1-N may be used to determine a perceived importance of tagged items (e.g. slot/intent/domain). The judges may rate the importance of each of the tagged items by viewing results obtained from different queries that include errors. The different results are displayed to the user to receive a perception rating that affects an importance of the tagged items within the understanding model(s). Language understanding model(s) 120 may relate to one or more different domains (e.g. movie domain, music domain, sport domain, and the like). The results may be displayed using different methods. Human perception ratings may be received for different items (e.g. slots/intents/domains and/or other classifiers). According to an embodiment, the human perception ratings are received for items obtained from a language understanding corpus 140 of tagged items.

For purposes of explanation, assume the example utterance being judged is "Show me some recent four star Brad Pitt movies." The tagged utterance includes three slots (ReleaseDate="recent", MovieRating="four star", MovieStar="Brad Pitt").

A first query is formed (e.g. recent four star Brad Pitt movies or some other query) using the three slots and is executed against a knowledge source (e.g. knowledge source 130) to obtain a first set of results. The knowledge source may be many different types of knowledge sources. According to an embodiment, the results are obtained from an Internet Search Engine such as MICROSOFT BING and/or from structured content (e.g. FREEBASE.COM). After the judge views the results returned using a query without errors, one or more errors are introduced into the query. The query may be changed manually/automatically. For example, a user may change the queries and/or random errors may be introduced into the query and/or model used to determine the tagging (e.g. slot/intent/domain).

For example, the original query may be changed to exclude the ReleaseDate slot (e.g. four star Brad Pitt movies) and executed against the knowledge source to obtain a second set of results. While more results may be returned to the judge(s), each judge may/may not perceive this error to be important. A rating for the perceived importance of the missing tag (i.e. the item affected by the error) is obtained from each of the judges. The rating may be a complex rating system and/or a simple rating system. For example, an item may be assigned a relative value and/or a scale may be used. A smaller relative value may be used to indicate that an error has less impact on the result as compared to a larger value.

According to an embodiment, a judge assigns a rating from one to five to each result set to indicate an importance of a tagged item (e.g. slot) that is currently being evaluated. A value of one indicates that the mistake for the specific slot tag did not have an impact on what the user wanted to see. A value of two indicates that the mistake did have some impact but not much of an impact. A value of three indicates that the mistake had impact but the user saw most of what they wanted to see. A value of four indicates that the mistake had significant impact on the results and the user got only part of what they wanted to see in the results. A value of five indicates that the mistake resulted in a useless outcome and the result has nothing/little to do with what they were expecting.

After receiving the human perception rating from one or more judges, another query may be formed with at least one different error (e.g. introduced/existing from a log . . . ). For example, the query may be changed to exclude the MovieRating slot (e.g. recent Brad Pitt movies) and executed against the knowledge source to obtain a third set of results. The judges then rate the results received from the query.

After receiving the human perception rating for the current set of results, another query may be formed with another error introduced. For example, the query may be changed to exclude the MovieStar slot (e.g. recent four star movies) and executed against the knowledge source to obtain a second set of results. The judge then rates the results received from the query.

According to an embodiment, at least one different query is created to account for each of the different tagged items being tested for human perception. According to another embodiment, an error may include a change/omission that affects more than one of the tagged items (e.g. an error that changes the MovieStar slot value to "Brad" and the recent slot to "movies from 2012-2013). Different queries affecting the same tagged item may also be created. For example, one query may test omitting the tagged item whereas one or more other queries may result in changes to the tagged item.

The human perception ratings may come from one or more judges and/or obtained from a model created using human perception and are used to update the language understanding corpus 150. After receiving the human perception ratings, they are used in training a model, such as a language understanding model 120 to include human perception (e.g. language understanding model 122). The human perception ratings may be aggregated to obtain an overall perception regarding the differences in an item's importance.

The relative perceptual importance of the different items may be modeled using different methods (e.g. as a simple weight vector, a model trained using features (lexical, knowledge, slot type, . . . ), and the like). The perceptual weight vector and/or or model are incorporated into the understanding model training process where items that are perceptually more important are weighted more heavily as compared to the items that are determined by human perception as less important.

According to an embodiment, application 110 is an application that is configured to receive human perception ratings for tagged items. Application 110 may be configured to receive speech input, keyboard input (e.g. a physical keyboard and/or SIP), text input, video based input, and the like. Application 110 may also provide multimodal output (e.g. speech, graphics, vibrations, sounds, . . . ). Perception manager 26 may provide information to/from application 110. A user may interact with a computing device (e.g. computing device 115) using gestures. Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like. Gestures may include touch input and non-touch input. A user may directly contact a touch surface and/or perform a gesture without touching a touch surface. For example, a user may point to an object, position an arm in a certain position (e.g. stop sign, wave, . . . ), and the like.

System 100 as illustrated may comprise zero or more touch screen input device/display that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that are in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezo-electric devices, capacitive sensors, resistive sensors, inductive sensors, laser vibrometers, and LED vibrometers. One or more recording devices may be used to detect speech and receive video/pictures (e.g. MICROSOFT KINECT, microphone(s), and the like). More details are provided below.

Figure 2:
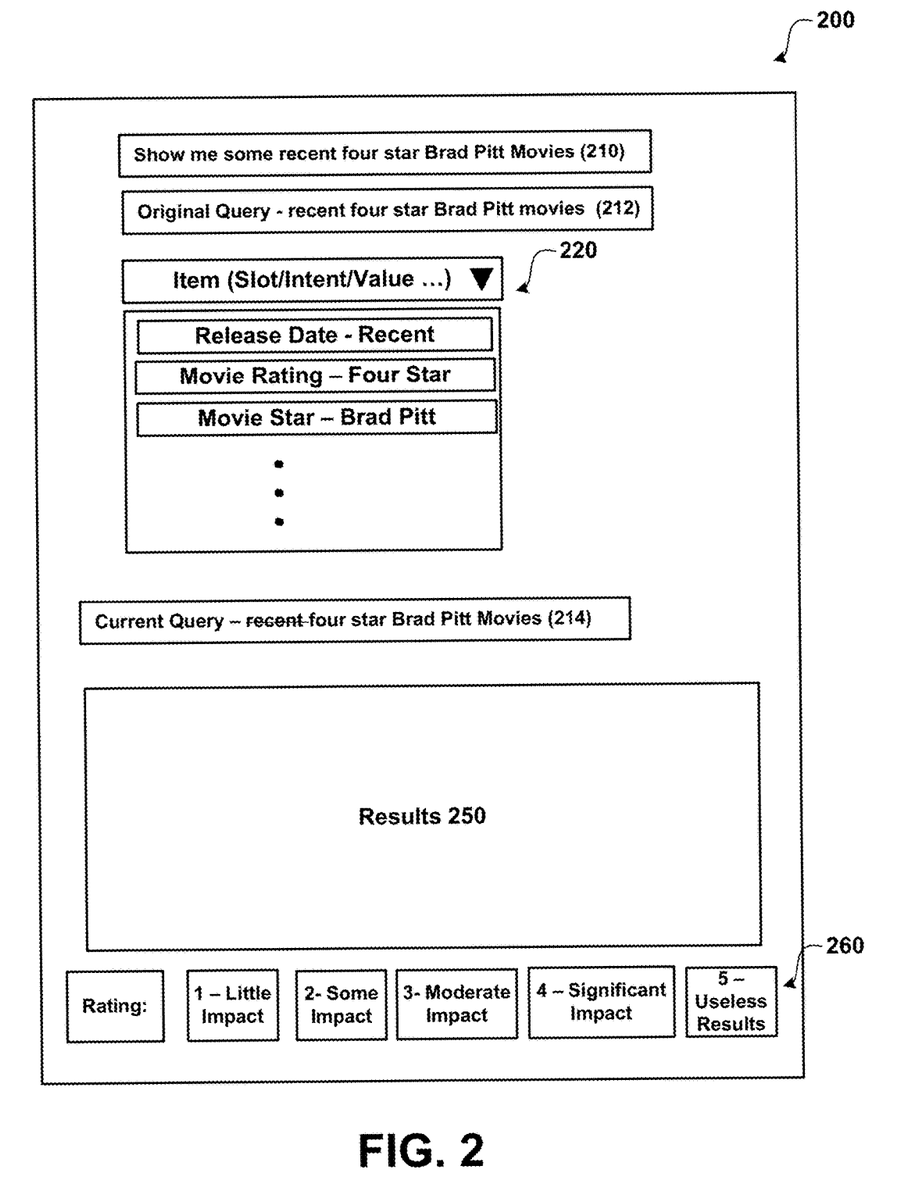
FIG. 2 shows a display of an exemplary human perception rating user interface.

FIG. 2 shows a display of an exemplary human perception rating user interface.

As illustrated, human perception rating interface 200 includes Graphical User Interface (GUI) elements for use in receiving human perception ratings used in training an understanding model. As illustrated, interface 200 includes: a display element 210 showing a received utterance; a display element 212 showing a an original query formed using the received utterance (e.g. generated by a language understanding system); a list of tagged items currently receiving a human perception rating; a current query 214 being evaluated and receiving a human perception rating; results 250 showing results using the current query and rating user interface elements 260 used in rating the current results returned from execution of the query.

While the elements are displayed in a particular order within the human perception rating interface 200, the elements may be displayed in other orders and/or other windows and/or with fewer/more elements according to other embodiments. For example, a different rating user interface element(s) may be used (i.e. receiving a value within a text box, selecting a checkbox, receiving a spoken language rating, and the like).

Human perception rating interface 200 may be used by a human judge to rate the relative importance of a tagged item (e.g. slot/intent/value or some other classification). When the understanding system processes the input and/or some other individual/system process the input (e.g. utterance 210), the tagged items receiving a human perception rating are displayed in item list 220. In the illustrated example, a human perception is being received for different slots (e.g. ReleaseDate, MovieRating, and MovieStar). According to an embodiment, a user may change the item being evaluated by selecting a different tagged item for the understanding system (e.g. from slot to domain/intent). The tagged items displayed in list 220 change in response to input 210 being changed. For example, a different utterance (e.g. sentence) obtained from a language understanding corpus may have different/fewer/more slots.

Current query 214 shows the current query receiving a human perception rating. In the current example, an error (removing the slot value "recent") is introduced into the original query. According to an embodiment, the human judge is able to see how the query is modified from the original query. In this example, a line is displayed through the slot value "recent" indicating that it is removed. Other display methods may be used.

Results 250 display the results obtained from executing the query against one or more knowledge sources.

Rating UI elements 260 are used by the human judge(s) to provide a human perception rating relating to the current query. While five different values may be selected from a human judge, other rating methods may be used (e.g. entry of a value between a range of values, a ranking system, a textual description that is interpreted at a later time, and the like). Generally, any method to receive a human perception rating relating to a particular tagged item may be used.

Figure 3:
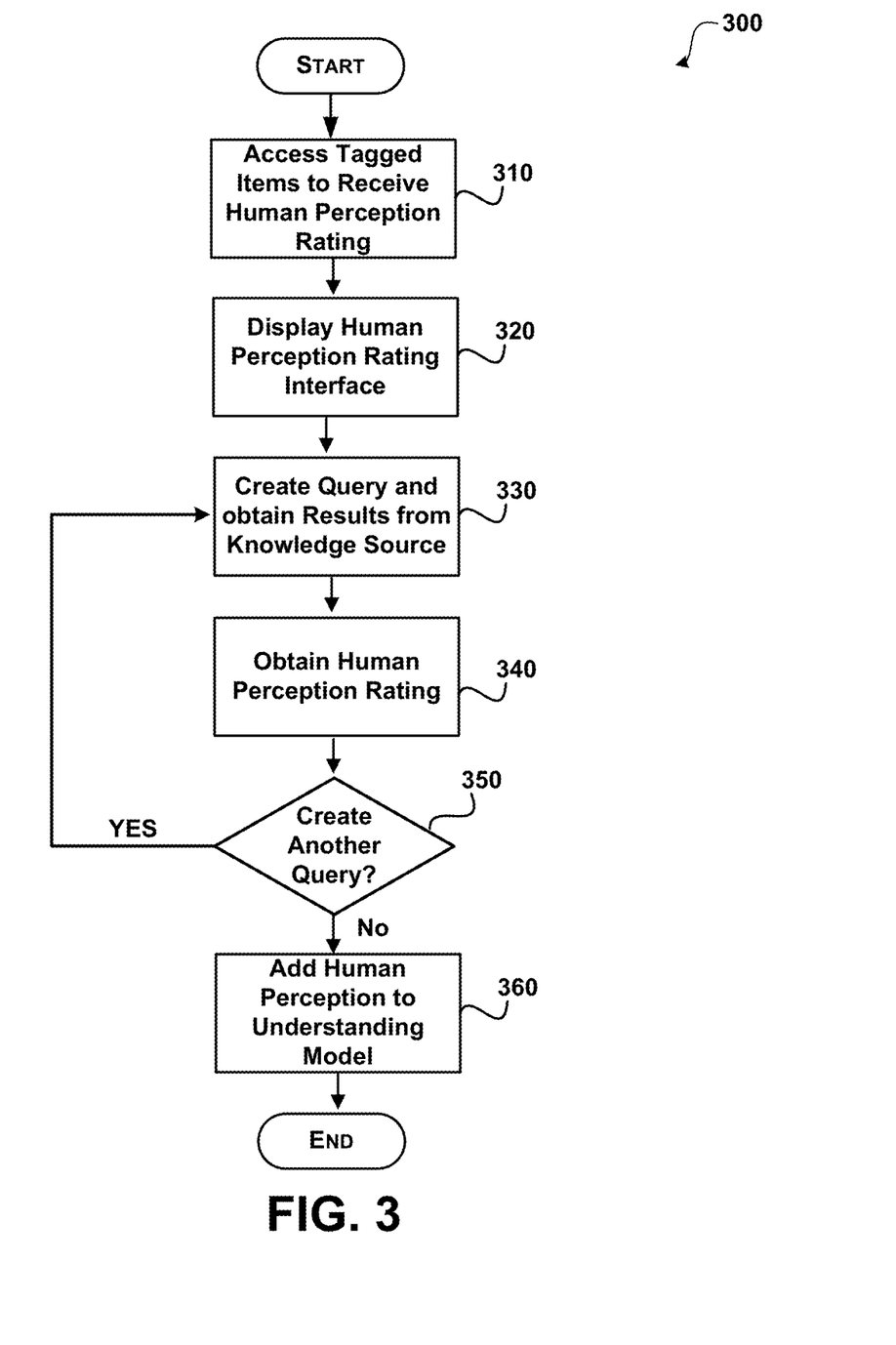
FIG. 3 shows an illustrative process for using human perception in building an understanding model.

FIG. 3 shows an illustrative process for using human perception in building an understanding model. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 310, where tagged items are accessed to receive a human perception rating. The tagged items may relate to different content, such as: slots, domains, intents as well as other systems that classify items. For example, the tagged items may related to a language understanding system, a document classification system, and the like. According to an embodiment, the tagged items are accessed from a language understanding corpus that is manually/automatically tagged. The language understanding corpus may be the real system logs (if there is already a system up and running) and/or simulated logs/utterances.

Flowing to operation 320, a human perception rating interface is displayed to receive human perception ratings for different results. Instead of determining the relative importance of each error type in an ad hoc way (e.g. MovieStar errors are twice as important as the ReleaseDate errors), the human perception rating interface may be used to receive actual human perception ratings. An exemplary human perception rating interface is described above with reference to FIG. 2.

Moving to decision operation 330, a query is created that is used to obtain results from one or more knowledge sources. According to an embodiment, the initial query that is created is a query that does not include errors. For example, the initial query is attempted to be created such that the results obtained from the knowledge source meet the user's expectations. When the query being created is not the initial query, the query is created with at least one error (e.g.

various language understanding errors such as slot type/ domain type/intent type). Each query that is created is paired with the corresponding knowledge results obtained using the query such that the judge(s) can see the impact of the understanding errors. The errors may be automatically created using models/logs of the understanding system and/or manually created by randomly introducing errors (e.g. to each slot/domain/intent in the utterance) and fetching the corresponding knowledge results.

Flowing to operation 340, the human perception rating is received for the results received using the created query. One or more judges assesses the impact of the introduced error(s) into the query. According to an embodiment, a rating for the results obtained using the query is received. The rating may be a complex rating system and/or a simple rating system. For example, an item may be assigned a relative value and/or a scale may be used. According to an embodiment, the human perception rating interface is used by the judges to receive the human perception rating. According to another embodiment, a model previously created that incorporates human perception in weighting the tagged items may be used to receive the human perception rating. For example, when a new model is being trained, a previously trained model that uses tagged items that received human perception ratings may be used to determine human perception ratings for the new model (e.g. the new model includes tagged items that are the same/similar to the previous model).

Transitioning to decision operation 350, a determination is made as to whether another query is to be created including at least one error for the current tagged items receiving a human perception rating. According to an embodiment, a query is created that introduces an error for each of the tagged items being assessed. For example, when a perceived importance of three slots are being evaluated, four queries are created. One query that does not include an error, and at least three queries with one or more errors introduced.

When there is another query to create, the process returns to operation 330. When there is not another query to create, the process flows to operation 360.

At operation 360, the human perception ratings is added to the understanding model. The understanding model is trained by minimizing the perceptual error determined from the human perception ratings instead of minimizing the error of the objective functions as traditional systems perform. The human perception ratings may also be incorporated into the language corpus. The model may be trained using machine learning models such as, but not limited to: SVM, Boosting, Maximum Entropy Models, Conditional Random Fields, Neural Nets, Deep Belief Networks and the like. The model may be a simple vector of relative importance weights for each of the tagged items (e.g. slot types).

The process then moves to an end operation and returns to processing other actions.

Figure 4:
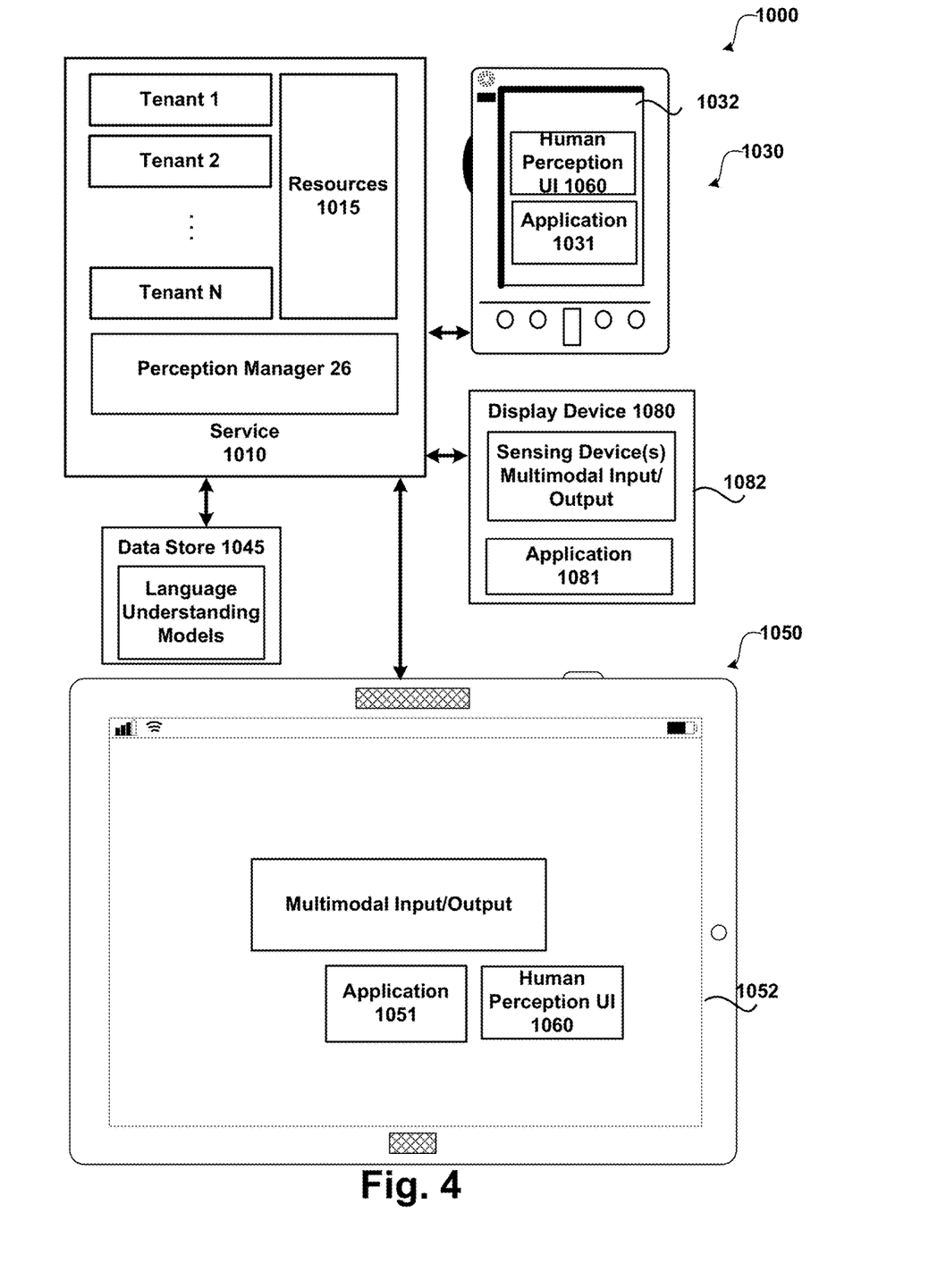
FIG. 4 illustrates an exemplary system that uses human perception in building an understanding model.

FIG. 4 illustrates an exemplary system that uses human perception in building an understanding model. As illustrated, system 1000 includes human perception user interface 1060, service 1010, data store 1045, touch screen input device/display 1050 (e.g. a slate) smart phone 1030, and display device 1080 (e.g. monitor/television, . . . ).

Each device (e.g. device 1050, smart phone 1030, display device) may be configured to receive input from one or more sensing devices. The sensing device may be a part of the device and/or separate from the device. The sensing device may be configured to capture user input using various input methods. A sensing device may include one or more microphones to capture spoken input (e.g. words) and one or more cameras to detect movement of a user (e.g. pictures/videos). The sensing device may also be configured to capture other inputs from a user such as by a keyboard and/or mouse (not pictured). For example, the sensing device may be a MICROSOFT KINECT® device comprising a plurality of cameras and a plurality of microphones As illustrated, service 1010 is a cloud based and/or enterprise based service that may be configured to provide services that receive multimodal input including utterances to interact with the service, such as services related to various applications (e.g. games, browsing, locating, productivity services (e.g. spreadsheets, documents, presentations, charts, messages, and the like)). The service may be interacted with using different types of input/output. For example, a user may use speech input, touch input, hardware based input, and the like. Functionality of one or more of the services/applications provided by service 1010 may also be configured as a client/server based application.

According to an embodiment, service 1010 is a multitenant NL conversational service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device/display 1050 and display device 1080 are configured with multimodal applications (1031, 1051, 1081). While the application is illustrated as part of the device, the application may be a network application (e.g. included as part of service 1010) that is stored externally from the device. The applications may include a human perception UI 1060 (e.g. See FIG. 2 and related discussion).

As illustrated, touch screen input device/display 1050 and smart phone 1030 shows exemplary displays 1052/1032/1082 showing the use of an application that utilize multimodal input/output (e.g. speech/graphical displays/gestures (touch/non-touch)). The applications may be used to receive a human perception rating of different items using human perception UI 1060. Data may be stored on a device (e.g. smart phone 1030, slate 1050 and/or at some other location (e.g. network data store 1045). Data store 1054 may be used to store models used by the language understanding system and update with received human perception ratings. The applications used by the devices may be client based applications, server based applications, cloud based applications and/or some combination.

Perception manager 26 is configured to perform operations relating to using human perception in building understanding models as described herein. While manager 26 is shown within service 1010, the all/part of the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
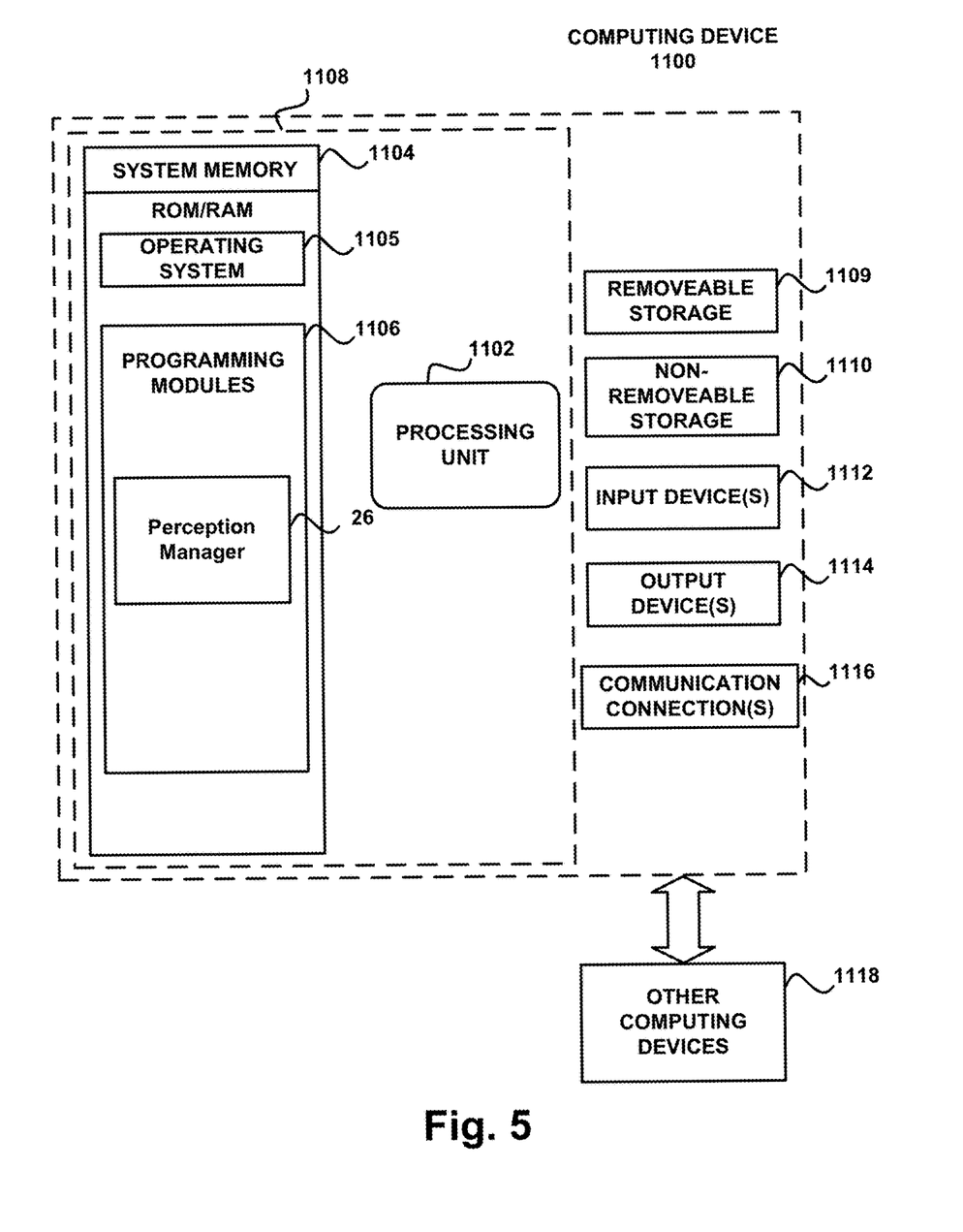
FIGS. 5, 6A, 6B, and 7 and the associated descriptions provide a discussion of a variety of operating environments in which embodiments of the invention may be practiced.
Figure 6A:
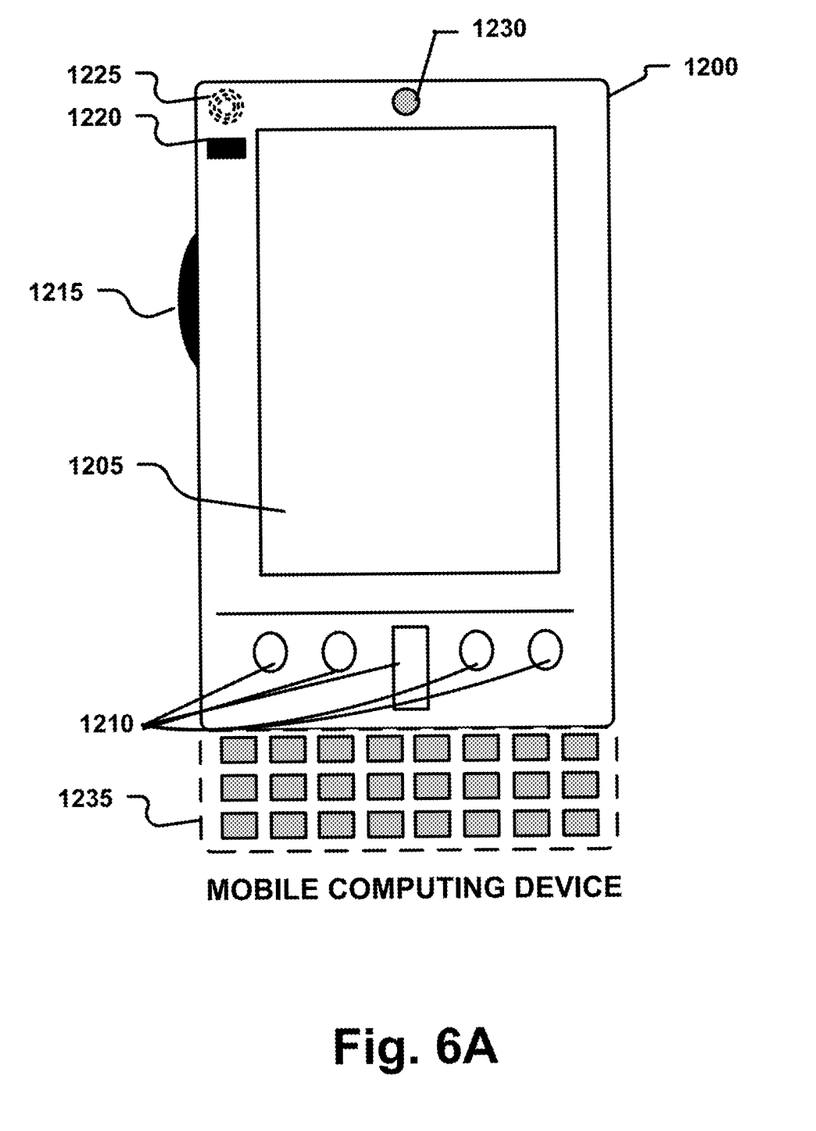
Figure 6B:
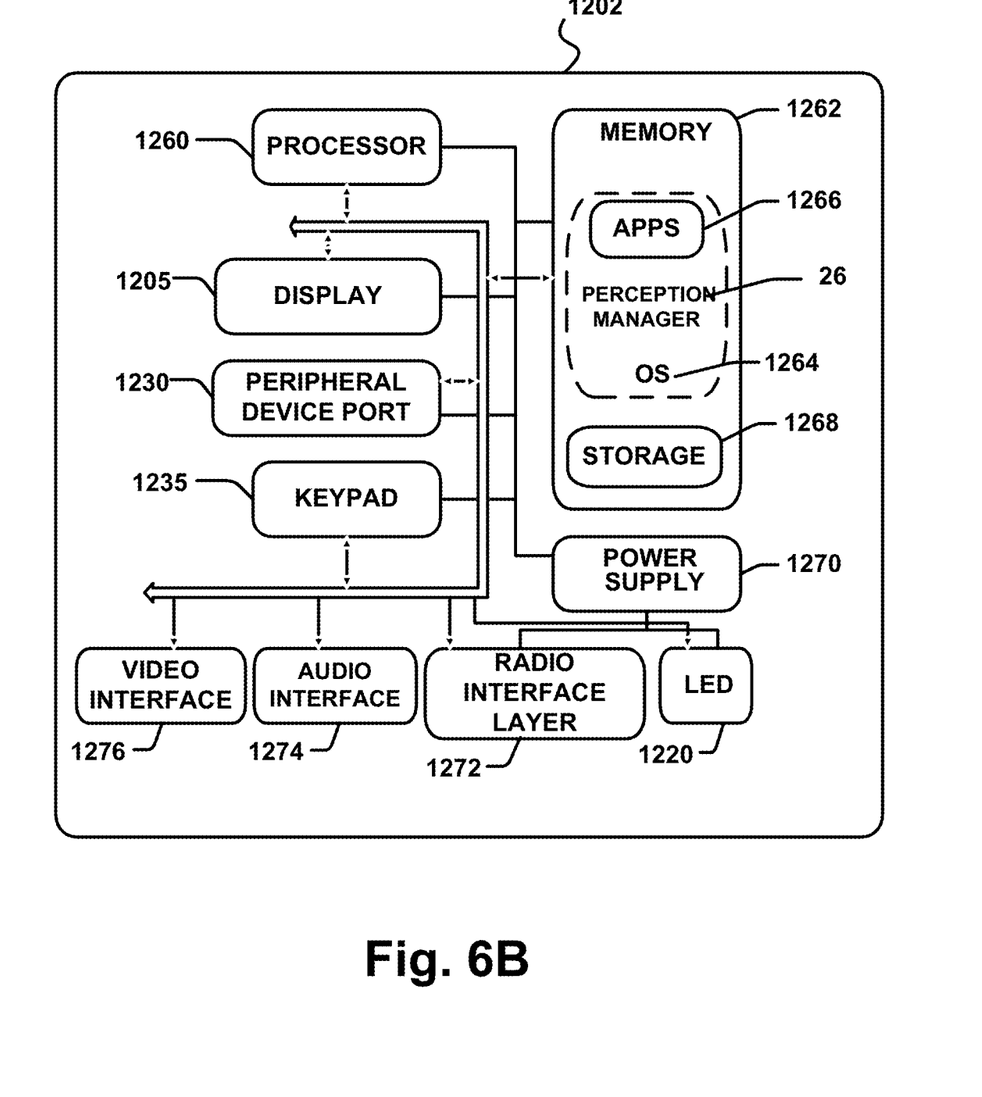
Figure 7:
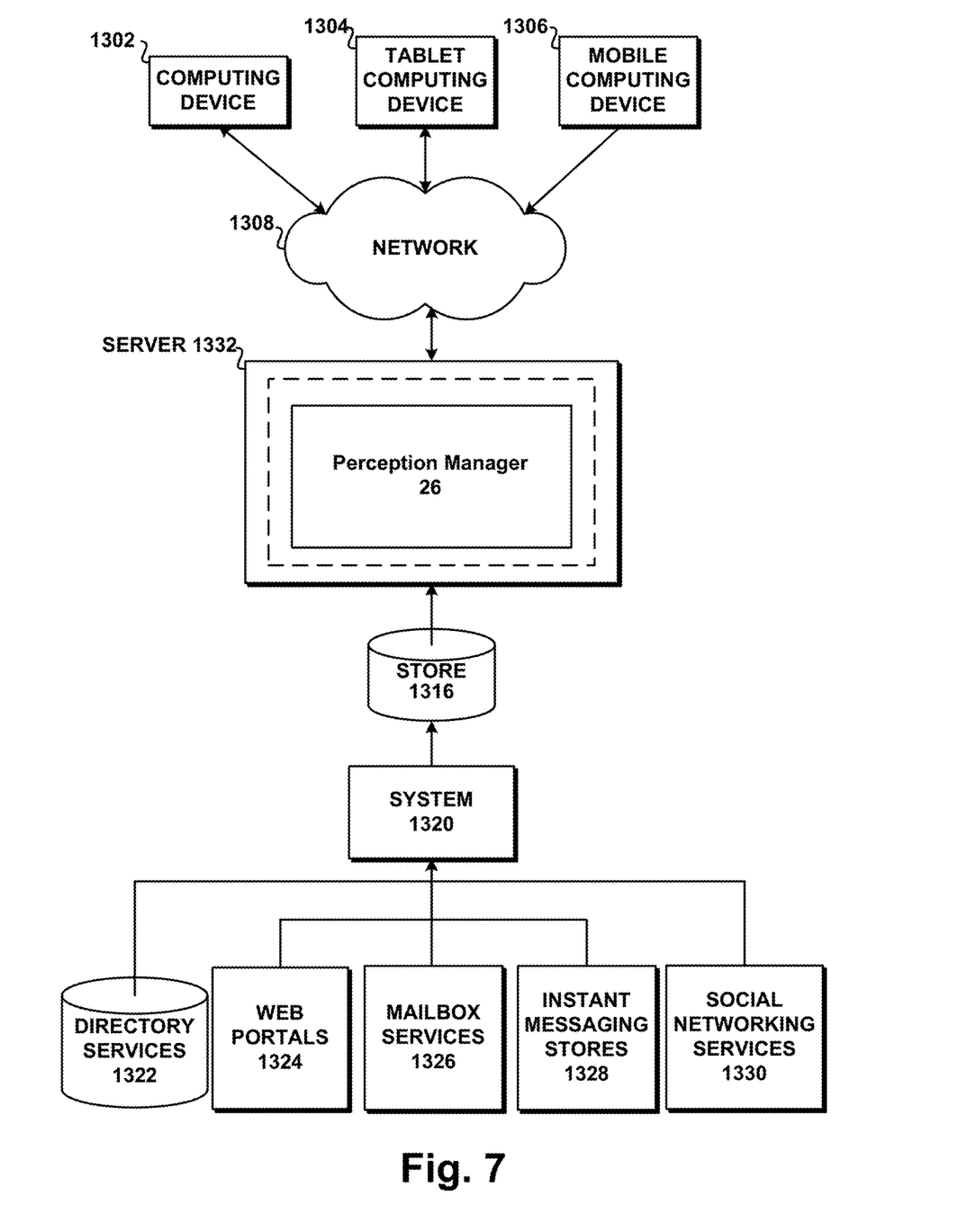

FIGS. 5, 6 and 7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a perception manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 5 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile telephone, a smartphone, a tablet personal computer, a laptop computer, and the like, with which embodiments of the invention may be practiced. With reference to FIG. 6A, an example mobile computing device 1200 for implementing the embodiments is illustrated. In a basic configuration, mobile computing device 1200 is a handheld computer having both input elements and output elements. Input elements may include touch screen display 1205 and input buttons 1210 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1210. Mobile computing device 1200 may also include an optional keypad 1235. Optional keypad 1235 may be a physical keypad or a "soft" keypad generated on the touch screen display.

Mobile computing device 1200 incorporates output elements, such as display 1205, which can display a graphical user interface (GUI). Other output elements include speaker 1225 and LED 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices.

FIG. 6B is a block diagram illustrating components of a mobile computing device used in one embodiment, such as the computing device shown in FIG. 6A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the perception manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone to receive audible input, such as to facilitate a telephone conversation. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 6B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 7 illustrates a system architecture for a system as described herein.

Components managed via the perception manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to using human perception in building understanding models as described herein. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for using human perception in training a language understanding model on a computing device, comprising:

accessing, on the computing device, tagged items that are used by the language understanding model;

creating a first query using the tagged items;

obtaining, from a knowledge source in communication with the computing device, a first result for the first query;

obtaining, by the computing device, a first human perception rating for the first result;

after obtaining the first human perception rating, automatically modifying at least one of the tagged items in the first query, wherein the modifying includes changing the value of the at least one of the tagged items;

in response to the modification, creating a second query using the at least one of the modified tagged items;

obtaining, from the knowledge source a second result for the second query;

obtaining, by the computing device, a second human perception rating for the second result, wherein obtaining the human perception rating for the first result and the second result comprises displaying a human perception rating user interface that is configured to receive a human perception rating for a respective result;

determining one or more values corresponding to a relative importance of each of the tagged items in the first query and the second query using the first human perception rating and the second human perception rating; and providing the one or more values as input to a language understanding model to train the language understanding model to determine the relative importance of each of the tagged items as determined from the human perception rating.

2. The method of claim 1, wherein accessing the tagged items that are used by the language understanding model comprises accessing a language understanding corpus that comprises tagged items selected from at least one of: slots; domains; and intents.

3. The method of claim 1, wherein creating the second query comprises removing at least one of the tagged items from the first query.

4. The method of claim 1, wherein obtaining the human perception rating for the first result and the second result comprises displaying a human perception rating panel that includes a display of: a current query; a current result set; and a human perception rating user interface element that is configured to receive a human perception rating for the current result set.

5. The method of claim 1, wherein obtaining the human perception rating for the first result and the second result comprises determining a relative importance of each of the tagged items in response to receiving a rating indication for the first result and the second result.

6. The method of claim 1, wherein accessing the tagged items that are used by the language understanding model comprises accessing different tagged utterances that are used in training the understanding model.

7. The method of claim 1, further comprising aggregating human perception ratings obtained from a plurality of judges.

8. The method of claim 1, wherein training the language understanding model comprises minimizing perceptual error determined from the human perception ratings.

9. A computer-readable storage device storing computer-executable instructions for using human perception in a language understanding model on a computing device, comprising:

accessing, on the computing device, a language understanding corpus comprising tagged items that are used by the language understanding model, wherein at least one of the tagged items is selected from the group consisting of tagged slots, tagged domains, and tagged intents;

creating a first query using the tagged items;

obtaining, from a knowledge source in communication with the computing device, a first result for the first query;

obtaining, by the computing device, a first human perception rating for the first result;

after obtaining the first human perception rating, automatically modifying at least one of the tagged items in the first query, wherein the modifying includes changing the value of the at least one of the tagged items;

in response to the modification, creating a second query using the at least one of the modified tagged items;

obtaining, from the knowledge source, a second result for the second query;

obtaining, by the computing device, a second human perception rating for the second result, wherein obtaining the human perception rating for the first result and the second result comprises displaying a human perception rating user interface that is configured to receive a human perception rating for a respective result;

determining one or more values corresponding to a relative importance of each of the tagged items in the first query and the second query using the first human perception rating and the second human perception rating; and providing the one or more values as input to a language understanding model to train the language understanding model to determine the relative importance of each of the tagged items as determined from the human perception rating.

10. The computer-readable storage device of claim 9, wherein creating the second query comprises removing at least one of the tagged items from the first query.

11. The computer-readable storage device of claim 9, wherein obtaining the human perception rating for the first result and the second result comprises displaying a human perception rating panel that includes a display of: a current query; a current result set; and a human perception rating user interface element that is configured to receive a human perception rating for the current result set.

12. The computer-readable storage device of claim 9, wherein obtaining the human perception rating for the first result and the second result comprises determining a relative importance of each of the tagged items in response to receiving a rating indication for the first result and the second result.

13. The computer-readable storage device of claim 9, wherein accessing the tagged items that are used by the language understanding model comprises accessing different tagged utterances that are used in training the language understanding model.

14. The computer-readable storage device of claim 9, further comprising aggregating human perception ratings obtained from a plurality of judges.

15. The computer-readable storage device of claim 9, wherein training the language understanding model comprises minimizing perceptual error determined from the human perception ratings.

16. A system for using human perception in a language understanding model, comprising:

a processor and memory;

an operating environment executing using the processor;

a display; and a perception manager that is configured to perform actions comprising:

accessing a language understanding corpus comprising tagged items that are used by the language understanding model, wherein at least one of the tagged items is selected from the group consisting of tagged slots, tagged domains, and tagged intents;

displaying a human perception rating panel on the display that includes a display of: a current query; a current result set; and a human perception rating user interface element that is configured to receive a human perception rating for the current result set;

creating a first query using the tagged items;

obtaining, from a knowledge source in communication with the computing device, a first result for the first query;

obtaining, by the computing device, a first human perception rating for the first result using the human perception rating panel;

after obtaining the first human perception rating, automatically modifying at least one of the tagged items in the first query, wherein the modifying includes changing the value of the at least one of the tagged items;

in response to the modification, creating a second query using the at least one of the modified tagged items;

obtaining, from the knowledge source, a second result for the second query;

obtaining a human perception rating for the second result using the human perception rating panel;

aggregating human perception ratings obtained from a plurality of judges;

determining one or more values corresponding to a relative importance of each of the tagged items using the human perception ratings; and providing the one or more values as input to a language understanding model to train the language understanding model to minimize perceptual error as determined from the human perception ratings.

17. The system of claim 16, wherein creating the second query comprises removing at least one of the tagged items from the first query.

18. The system of claim 16, wherein obtaining the human perception rating for the first result and the second result comprises determining a relative importance of each of the tagged items in response to receiving a rating indication for the first result and the second result.

19. The system of claim 16, wherein accessing the tagged items that are used by the language understanding model comprises accessing different tagged utterances that are used in training the language understanding model.

* * * * *